W. H. FULLER.

CULTIVATOR.

No. 11,134. Reissued Dec. 23, 1890.

Witnesses

Wm. S. Hodges

D. A. Millick

Inventor

By William H. Fuller

Patrick O'Farrell

Attorney

THE NORRIS PETERS CO., PHOTO-LITHO., WASHINGTON, D. C.

UNITED STATES PATENT OFFICE.

WILLIAM H. FULLER, OF BLADEN, NEBRASKA.

CULTIVATOR.

SPECIFICATION forming part of Reissued Letters Patent No. 11,134, dated December 23, 1890.

Original No. 419,936, dated January 21, 1890. Application for reissue filed May 9, 1890. Serial No. 351,212.

*To all whom it may concern:*

Be it known that I, WILLIAM H. FULLER, a citizen of the United States, residing at Bladen, in the county of Webster and State of Nebraska, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention pertains to certain new and useful improvements in cultivators, being an improvement on the construction shown and described in Letters Patent No. 397,705, granted to me January 29, 1889; and it comprises the details of construction, combination, and arrangement of parts, substantially as hereinafter fully set forth, and particularly pointed out in the claims.

Figure 1:
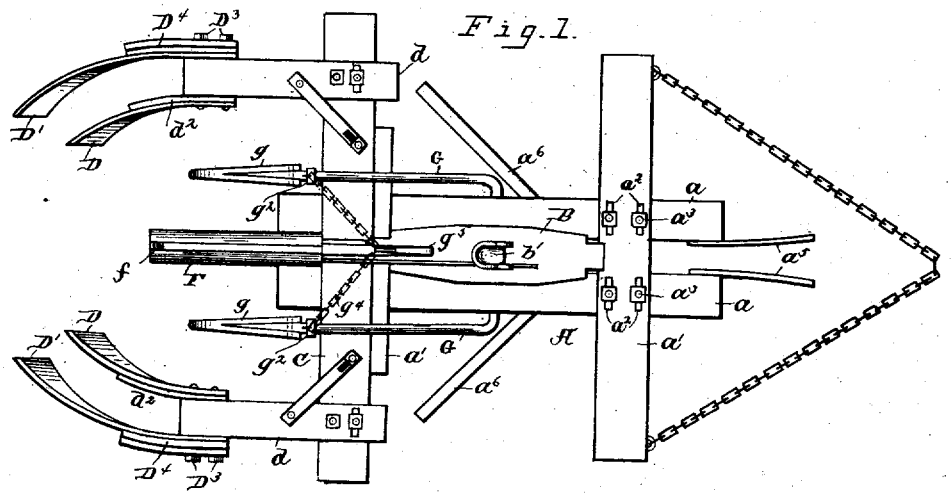
Figure 2:
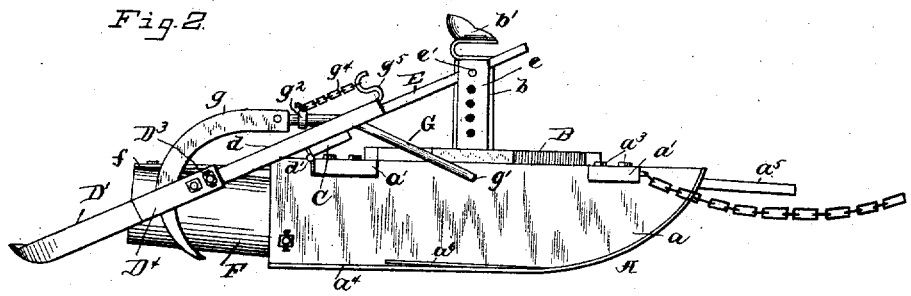
Figure 3:
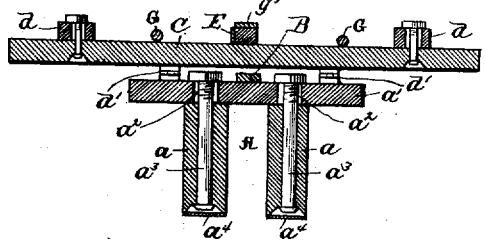
Figure 4:
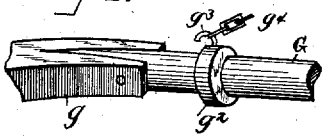

In the accompanying drawings, Figure 1 is a plan view of my improved cultivator. Fig. 2 is a side elevation. Fig. 3 is a vertical sectional view on the line $x$ $x$, Fig. 1. Fig 4 is a detail perspective view.

Referring to the drawings, A designates the sled or cultivator frame, composed of two runners $a$ $a$, adjustably connected together by transverse bars $a'$, through slots $a^2$ in which are passed nutted bolts $a^3$. The draft-horses are attached to the front bar $a'$. The runners are provided on their lower edges with steel plates $a^4$, and at their forward ends with opposite outwardly-curved arms $a^5$ for proper guidance of the corn. Between the plates $a^3$ and the runners $a$ are secured the inner ends of divergent knives $a^6$ $a^6$, as shown. The transverse bars $a'$ are connected at their centers by a bar B, upon a post $b$ of which is secured the driver's seat $b'$. The knives $a^6$ are made of thin spring metal, so that they can spring and adjust themselves to any listed furrows, and conform to inequalities in the earth's surface. These knives are also self-sharpeners, since they wear from the under side.

C is a frame composed of one cross-bar and two end bars $d$ $d$, to which are adjustably secured leveling-arms D D'. This frame is pivotally secured to frame A by hinges $d'$, attached thereto and to the rear transverse bar $a'$. A foot or hand lever E is secured at its rear end to frame C, and is projected between a plate $e$ and post $b$, to which and bar B said plate is secured. This plate has a series of apertures, through which a pin $e'$ is inserted to hold the frame at any angle. The leveling-arms D have each a single strengthening-piece $d^2$ secured to its outer side by bolts or rivets $D^3$, while the outer longer arms D' have two such strengthening-pieces $D^4$ similarly secured. A shield F, having an adjustable bar $f$, is secured to the rear end of runners $a$ similarly to that described in my before-mentioned patent.

G G are the cultivator drag-bars, having rear pivoted sections $g$ $g$. The forward ends of said drag-bars are bent at right angles and inserted through coincident apertures $g'$ of runners $a$. Upon these drag-bars are secured adjustable collars $g^2$, having hooks $g^3$, to which are secured the ends of a chain or chains $g^4$, the forward ends of said chains being connected to a bail $g^5$ of frame C. By means of these chains and collars and lever E the drag-bars can be held at any desired point, and can also be readily elevated and caused to rest on the front bar $a'$.

The advantages of my invention will be at once apparent, and it will be particularly observed that by means of the pivoted frame and foot-lever the operator can readily and easily raise and lower the leveling-arms and drag-bars to any desired point.

I claim as my invention—

1. As an improvement in cultivators, the combination, with the main frame having the transverse bars, of the rear frame pivotally secured to one of said bars and having rearwardly-projecting arms, and the leveling-arms adjustably secured thereto, substantially as set forth.

2. The combination, with the main frame, of the rear frame pivotally secured thereto and carrying the leveling-arms, the foot-lever secured to said rear frame, and the means for securing the same, substantially as set forth.

3. The combination, with the main frame, of the drag-bars having their forward ends secured thereto, the adjustable collars on said drag-bars provided with hooks, and the chains connected to said hooks, substantially as set forth.

In testimony whereof I affix my signature in presence of two witnesses.

WILLIAM H. FULLER.

Witnesses:
F. W. McLAUGHLIN,
V. S. HALL.